UNITED STATES PATENT OFFICE.

THOMAS G. BLACKLOCK, OF BROOKLYN, NEW YORK, ASSIGNOR TO PETER B. OLNEY, JR., TRUSTEE, OF NEW YORK, N. Y.

PREVENTING RAVAGES OF WEEVILS.

1,232,759.  Specification of Letters Patent.  Patented July 10, 1917.

No Drawing.  Application filed November 13, 1916.  Serial No. 131,181.

*To all whom it may concern:*

Be it known that I, THOMAS G. BLACKLOCK, residing at #1292 Halsey street, Brooklyn, county of Kings, State of New York, have invented certain new and useful Improvements in Preventing Ravages of Weevils, of which the following is a full, clear, and exact description.

In the manufacture, preparation, storage and commercial handling of many staple food products, such as cereals, bakers' products, dried fruits and various ingredients used in baking and other purposes, it has been observed that they were peculiarly subject to the attack of a beetle, commonly known as the grain weevil. These insects are of very small size and gain access without difficulty into almost any form of paper or pasteboard cartons, wooden boxes or other envelops in which the susceptible material may be confined, through cracks or openings, which may be very minute and having once gained entrance within the package, attack the material and breed therein, whereby the contents become speedily spoiled and unfit for use or human consumption.

Many substances, but generally those of a purely chemical nature, have been resorted to in attempts to destroy the weevils or limit and reduce the expensive effects of their ravages. The intended preventives, for example, have been applied to the shelves, the bins or receptacles where the food products have been stored, but heretofore no substance of a strictly non-poisonous, harmless and entirely unobjectionable nature has been discovered, which could be generally used for the purpose under practicable and commercial conditions.

I have found that the celery plant or seed, presumably by reason of its pronounced odor, is peculiarly offensive to the weevil beetle, and that the latter studiously avoid approaching any object within the immediate influence of the plant or any part or extract of the same that emits the characteristic celery odor. I have therefore conceived the plan of repelling the weevil and protecting any or all of those products, which are susceptible to its attacks by associating with the cartons, the boxes, bags, or any other surface, with which such substance comes in contact or in close proximity therewith, celery in some form that imparts its characteristic odor or other repellent effect whatever that may be.

This may be accomplished in many ways, for I have found that the presence of any part of the plant in any form in which it retains its natural characteristic properties, is ample to prevent the approach and ravages of the weevil. For example, any part of the plant, whether leaves, stock, root or seeds, if taken in their normal edible condition may be dried and pulverized and used in that condition or from the plant or its seeds its peculiar virtues may be extracted by steeping in many ways and the liquor itself used.

If used in solid form, the celery may be sprinkled upon the surfaces to be protected or inclosed in any suitable containers permeable to its effects. If the liquid extract be used, it may be combined with the paste used in making up cartons or the latter, of whatever description or composition may be saturated with it. In any case, no weevils will approach or attack any substance protected by it, so long as its original repellent properties are retained.

In applying this preventive to food products, for either human or animal consumption, to seeds liable to attack and any other substance of a like nature, I may use the celery in any of the following ways which show the nature and extent of its use.

(1) As an ingredient in adhesive substances used in gluing together paper or card-board containers or cartons or securing advertising labels to the same at any stage of their manufacture and use.

(2) As an ingredient in adhesive substances employed in gluing ribbon strips to effectively seal folding tops or bottoms of cartons or containers.

(3) As an ingredient in the water employed in the manufacture of pulp used in any form of paper to be used as the material for containers.

(4) As an ingredient in the water employed in preparing sizing employed in glazing paper or wood used for the same purpose.

(5) As an ingredient in water or steam within an inclosed space to combine the odor with paper, cloth, wood or fibrous materials used in the manufacture of cloth, paper or wooden bags, cartons, boxes or panels.

(6) As an ingredient in liquids employed as germicidal sprays, or for dipping seeds or the like.

(7) As a dry material or powder for spraying or dusting on bags, boxes, containers, storage bins or rooms used for storage purposes.

(8) In powdered or granular form mixed with pulp or fibrous materials and compacted into sheets to form division walls in containers of any kind, or to serve as signs or labels for advertising matter in containers.

(9) In powdered or granular or similar convenient form to be used with adhesive materials in making up sticks or blocks for use in bags, cartons, boxes, barrels, bins or storage rooms, and of sufficient size to be readily recovered and removed, when desired.

(10) In powdered, granular or liquid form to be used with sawdust, chaff, excelsior, waste and other such materials and as a packing material for any purpose.

Other uses are quite possible, but the above will serve to show my intended use of the material.

This invention provides a harmless, unobjectionable material which may be used with any kind of staple food product and the like without impairing its quality or interfering in any way with its sale. Articles protected by it will be absolutely immune to the attacks of weevils and may be packed, shipped, stored and exposed for sale for indefinite periods without harm, damage or deterioration.

What I claim is:

1. A material for repelling and preventing the attacks of weevils on food products, seeds and the like having as its substantial constituent the active principle and characteristic the odor of the celery plant and in a form that adapts it to be maintained in close proximity to the article to be protected without deleterious mixture or union with the said article.

2. The combination with articles of food and the like which are subject to the attack of weevils of a material for repelling and preventing such attacks containing as its essential ingredient celery in a form which adapts said material to be retained in close proximity to the articles without deleterious mixture or union therewith.

3. The combination with a given quantity of an article of food or the like which is subject to the attack of weevils, of a container therefor the material of which is conbined with celery in proper form to exercise the weevil repellent properties of that plant on the article in the container.

4. The combination with a given quantity of an article of food or the like which is subject to the attack of weevils of a container composed essentially of paper with which is permanently associated celery in a form to exercise its weevil repellent properties on the contents of said container.

5. The combination with a given quantity of an article of food or the like which is subject to the attack of weevils, of a container composed essentially of paper, glued together to form a closed envelop or container, by an adhesive substance containing as an ingredient celery in a form to exercise its weevil repellent properties.

In testimony whereof I affix my signature in the presence of two subscribing witnesses.

THOMAS G. BLACKLOCK.

Witnesses:
SEQUINNY B. OLNEY,
FRED'K A. DELATOUR.

Copies of this patent may be obtained for five cents each, by addressing the "Commissioner of Patents, Washington, D. C."